United States Patent [19]

Brysch

[11] 4,072,330

[45] Feb. 7, 1978

[54] SLIP-ON PIPETTE TIP MEMBER AND PIPETTE DEVICE THEREFOR

[75] Inventor: Gottfried Brysch, Hamburg, Germany

[73] Assignee: Eppendorf Geratebau Netheler & Hinz GmbH, Hamburg, Germany

[21] Appl. No.: 690,151

[22] Filed: May 26, 1976

[30] Foreign Application Priority Data

June 12, 1975 Germany ............................ 2526296

[51] Int. Cl.2 .......................... B01L 3/02; F16L 47/00

[52] U.S. Cl. ............................... 285/239; 73/425.4 P; 285/332; 285/423

[58] Field of Search ............... 285/332, 239, 240, 238 285/260, 423; 73/425.4 P, 425.6; 128/239, 247, 218 P, 219

[56] References Cited

U.S. PATENT DOCUMENTS

| | | | |
|---|---|---|---|
| 980,355 | 1/1911 | Spencer | 285/260 |
| 2,271,546 | 2/1942 | Eisele | 285/332 X |
| 2,499,106 | 2/1950 | Metzkier | 285/332 X |
| 3,236,546 | 2/1966 | Cranskens | 285/260 X |
| 3,401,774 | 9/1968 | Krahn | 285/332 X |
| 3,554,580 | 1/1971 | Goyke | 285/260 |
| 3,732,734 | 5/1973 | Avakian | 285/239 X |

FOREIGN PATENT DOCUMENTS

| | | | |
|---|---|---|---|
| 949,854 | 3/1949 | France | 285/260 |
| 1,066,515 | 10/1959 | Germany | 285/332 |
| 682,480 | 11/1952 | United Kingdom | 285/239 |
| 986,025 | 3/1965 | United Kingdom | 285/240 |

*Primary Examiner*—Thomas F. Callaghan

*Attorney, Agent, or Firm*—Toren, McGeady and Stanger

[57] ABSTRACT

A detachable pipette tip member that may be "snapped" onto an adapter cone portion of a pipette body. The wall portion of the tip member engagable by the adapter cone defines a deformable conical sealing zone with yieldable characteristics obtained by a selective reduction of the wall thickness of the tip member in the sealing zone.

11 Claims, 10 Drawing Figures

SLIP-ON PIPETTE TIP MEMBER AND PIPETTE DEVICE THEREFOR

The present invention relates to a detachable or slip-on tip member in the form of an elongate receptacle being at least partly of a conical configuration mating an adapter cone of a pipette device onto which the tip member may be engaged, the tip member having a top mounting opening, and furthermore to a pipette device having an adapter cone that according to a suitable embodiment may consist of a projecting conically tapered collar disposed in a sealing region.

Pipette tip members are generally molded from a plastic material and are of a conical configuration at least in the region of the open tip end. The other likewise open end of the pipette tip member may be engaged onto an adapter cone of a pipette. This adapter cone includes an inner central bore communicating with a cylindrical chamber in which air volume may be displaced, in order to empty or to fill the pipette tip member.

It is likewise known to movably arrange an outer jacket or an abutment of the pipette casing, for the purpose of rejecting or disengaging the pipette tip member.

The pipette tip member must be slipped onto the adapter cone in a manner so as to obtain an airtight engagement, otherwise the intake volume would not be metered correctly.

To improve the sealing arrangement, it is likewise known to provide a conically tapered shoulder in the sealing zone at the adapter cone, in order to obtain a positive engagement of the pipette tip member. Alternately, the adapter cone may consist of a conical surface throughout.

Because of tolerances in the manufacturing process of pipette tip members and since the latter are sometimes somewhat out-of-round, due to manufacturing conditions such as material flow when molding the tip members, heretofore known pipette tip members require the application of a substantial pressure in being mounted on the adapter cone of a pipette. The use of such pressure merely has the effect of compensating for existing tolerances or out-of-roundness.

It is, therefore, an object of the present invention to provide a novel and improved pipette device and particularly a pipette tip member in which are avoided disadvantages due to tolerances and out-of-round shapes, the sealing properties are improved and mounting as well as disengaging the pipette tip member may be effected by applying a smaller force than is required in heretofore known devices of this type.

In accordance with the present invention, this object is achieved by a slip-on type pipette tip member in which the sealing zone adapted to be engaged by an adapter cone is deformable and exhibits yieldable characteristics, obtained by suitable selection of wall thickness, particularly by a reduction of wall rigidity. Due to yieldable properties obtained by a lesser wall thickness in the sealing zone, the pipette tip member more readily adapts itself to the adapter cone, particularly if the latter is in the form of a projecting conically tapered collar.

The proposed arrangement ensures proper sealing even when mounting the pipette tip member by applying only a relatively small pressure force. This is particularly advantageous when withdrawing the pipette tip member from a package such as a pallet, by introducing the adapter cone of a pipette into the pipette tip member.

Preferably the wall of the pipette tip member is slightly resilient in the region of the sealing zone. This resiliency may be obtained by suitably reducing the wall rigidity by one of several expedients. At the same time, the resiliency provides particularly favorable sealing properties because the pipette tip member may virtually be "clamped" onto the adapter cone at the sealing zone.

In a particularly preferred embodiment the pipette tip member includes a wall portion of a reduced wall rigidity within an uninterrupted annular region. This reduced rigidity annular region may be of an axial extension generally exceeding the axial extension of the sealing zone and provides the advantage of a radial-symmetrical design favorable to the final shape and the shape retaining properties of the pipette tip member.

According to another embodiment, the reduced rigidity of the pipette tip member wall may be provided by a plurality of grooves extending in the axial direction of the tip member.

In another suitable embodiment the thickness of the reduced thickness wall portion is substantially constant, at least along the axial extension of the sealing zone. This provides substantially even extensibility or adaptability along the whole length of the sealing zone. In a particularly preferred embodiment, the thickness of the reduced thickness wall portion varies at least along the axial extension of the sealing zone. This design allows for suitable guiding properties when mounting or respectively disengaging a pipette tip member.

Preferably, the thickness of the reduced thickness wall portion increases from the upper end toward the lower end of the sealing zone. In this configuration, the upper portion of the sealing zone is more yieldable than the lower portion, and this effect is particularly advantageous as explained above.

In a pipette tip member in which the sealing zone is disposed in a conical wall portion spaced from the top mounting opening, a restriction may be formed below an upper wall portion of a substantially even thickness, and below this restriction the wall thickness within the sealing zone may gradually increase in a downward direction toward the open lower tip end, up to the overall normal wall thickness of the tip member. This embodiment is of an overall high stability and rigidity but is sufficiently deformable and adaptable. Due to the various wall thicknesses along the length of the sealing zone the engagement and disengagement of pipette tip members if facilitated.

The last-described embodiment is well suited for production processes since the shoulder defined below the upper portion of increased wall thickness ensures a restricting effect in the material flow during the molding process and thus contributes towards obtaining an even circumferential material distribution also when injecting the molding material into the mold through one port only. Therefore shapes of an improved roundness in cross-section and an enhanced stability may be obtained.

In the particularly preferred embodiment the wall thickness may be reduced at the outer surface of the pipette tip member.

In this configuration, the inner wall surface is conical throughout which is of advantage with respect to defining precise pipetting volumes. It is particularly preferred to space the sealing zone from the edge of the top mounting opening of the pipette tip member, the sealing zone being defined in the present specification as a region of a reduced wall rigidity or a reduced wall thickness that is engagable by the adapter cone of the pipette. By this expedient, the upper edge of a greater width of the pipette tip member may be made fairly rigid so as to define a stable support for an ejector device or respectively a support engageable by the pipette body. Alternately, the reduced thickness wall portion may be arranged at the end having a greater width of the pipette tip member. In this case, the deformability and adaptability are provided in a region extending from the upper edge up to the sealing zone.

The last mentioned embodiment may be modified by providing a continuous annular outer bead at the pipette tip member end having a greater width. Such a bead as well as the normal wall thickness above a yieldable sealing zone spaced from the upper edge is advantageous insofar as a low resiliency may be used for slipping on and virtually resiliently mounting the pipette tip member onto an adapter cone. In a further modification, a first bead may be arranged above the reduced thickness wall portion, and a second bead may be arranged below the reduced thickness wall portion. Independently of the precise location of the yieldable sealing zone there may be provided a plurality of support surfaces spaced from the top mounting opening of the pipette tip member, these support surfaces being defined e.g. by axial ribs adjacent the top mounting opening. It is particularly preferred to arrange support surfaces of this type or ribs in an upper region of normal rigidity of the pipette tip member.

The upper end of a greater width of the pipette tip member is the end by which the tip member may be mounted onto the adapter cone. The present invention is particularly directed to a pipette tip member including the above indicated characteristics.

In the device, the pipette preferably includes an adapter cone having a projecting conically tapered collar in the sealing zone. Correspondingly, the length in the axial direction of the reduced rigidity wall portion in the sealing zone exceeds the length of the conical collar.

In a particularly preferred embodiment the adapter cone of the pipette may be spherically convex in the sealing zone and may be defined by a projecting collar having a spherical outer surface. With a configuration of this type, the yieldable or resilient portion of the pipette tip member may advantageously be used for establishing a proper seat having efficient sealing properties.

In the following, the present invention will be described more in detail with reference to several advantageous embodiments shown in the appended drawings. In these drawings, the pipette tip member is depicted in a greatly enlarged scale.

Figure 1:
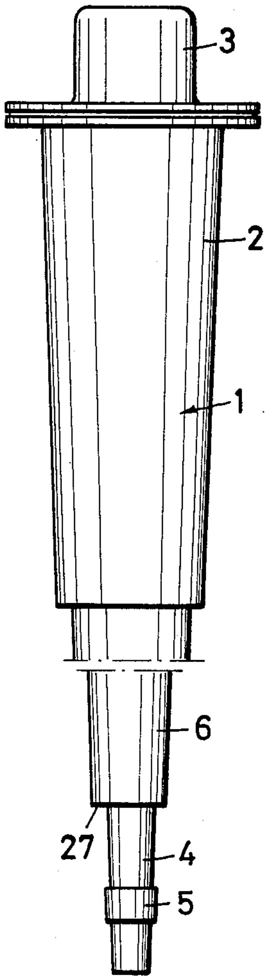
FIG. 1 is a lateral elevational view of a pipette device.

Referring to FIG. 1, there is shown a pipette 1 including a handle 2 and at its upper end an actuating button 3 for operating an inner plunger (not shown). An adapter cone 4 is provided at the lower end of the pipette. The adapter cone 4 includes a projecting conically tapered collar 5 disposed within a so-called sealing zone.

A sleeve type casing member 6 may serve, by a downward movement, to disengage a pipette tip member mounted on the adapter cone 4.

The pipette tip member 7 shown in FIG. 2 includes adjacent its upper opening 8 a slightly tapered conical portion 9 and below the same, toward the lower end, a more tapered conical portion 10 in which the inlet opening 11 is provided. As may be seen from the drawing, there is provided a reduced rigidity or reduced thickness wall portion 13 at the outer surface of the pipette tip member within the sealing zone 12 the location of which substantially corresponds to the location of the collar 5 of the pipette shown in FIG. 1. The sealing zone 12 is suitably of a greater length in axial direction than the collar 5 and is spaced from the upper edge 8. Thus there is defined an upper relatively rigid portion 14 of a normal wall thickness. The "normal" wall thickness may here be defined as the mean wall thickness of the pipette tip member, this mean wall thickness being approximately constant along the whole tip member. A plurality of ribs 15 may be equally spaced about the outer circumference of the upper portion 14. The upper edge of these ribs 15 is flush with the upper edge 8, and the bottom edge 16 of these ribs 15 defines a support for supporting the pipette tip member in a package or a pallet provided with suitable apertures for holding the tip member.

The reduced thickness wall portion 13 may consist of a step-shaped restriction defined by an inclined shoulder surface 17 at the upper end of the wall portion, i.e., the end more adjacent the edge 8, followed by a tapered portion in which the wall thickness gradually increases in downward direction up to the normal wall thickness of the pipette tip member. The point at which the normal wall thickness is reached is indicated at 19, and the dashed line 20 serves to illustrate that a portion of triangular cross-section has been removed. The reduction of wall thickness varies along the axial length of this portion whereby the wall thickness in the upper part of the sealing zone 12 is smaller than in the lower part toward the lower end of the pipette tip member.

Figure 2:
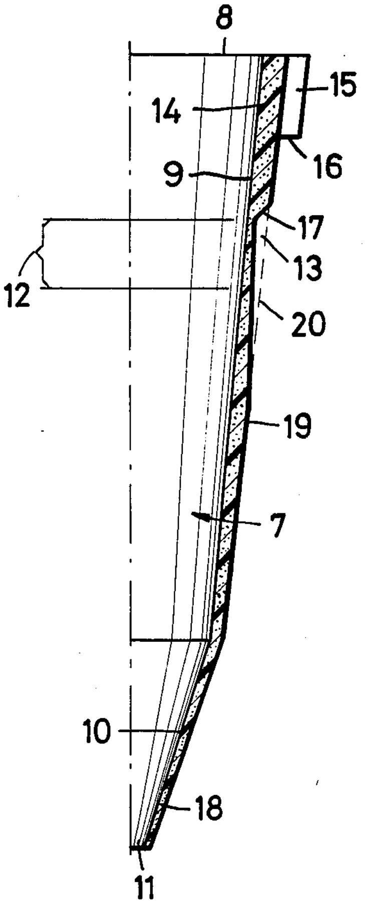
FIG. 2 is an axial half-sectional view of a pipette tip member in accordance with the present invention.
Figure 3:
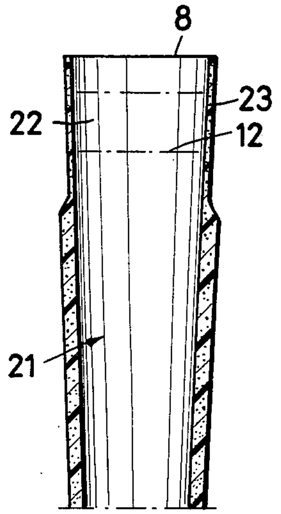
FIGS. 3 - 7 are sectional views of different embodiments of pipette tip members in accordance with the present invention.

The embodiment shown in FIG. 2 represents a preferred embodiment. In an alternate embodiment such as the one shown in FIG. 3 the pipette tip member 21 includes a reduced thickness wall portion 23 extending from the edge of the upper opening 8, i.e., from the wider end of the pipette tip member. In this embodiment, the reduced thickness wall portion 23 is of course arranged to be slipped onto a correspondingly disposed adapter cone.

Figure 4:
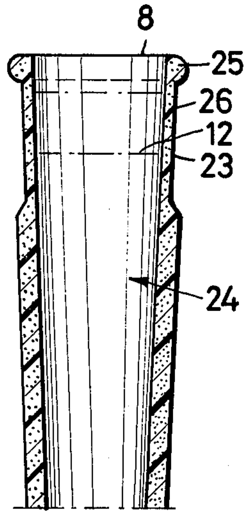

Referring to the embodiment shown in FIG. 4, the pipette tip member 24 includes an outer bead 25 extending about the edge of the upper opening 8. By this bead in the region of the reduced thickness wall portion 23, i.e., the wall portion 26, the upper edge of the opening 8 which may be slipped onto a collar type adapter cone is reinforced in thus improving the seating and sealing properties of the sealing zone. The same likewise applies to the region above the shoulder 17 in the embodiment shown in FIG. 2.

In the embodiments of FIGS. 2 and 4, the upper increased rigidity portion 14 or the bead 25 respectively are more favorable with respect to the usage of ejector devices, e.g. by moving the sleeve type casing member 6 downwardly so that the bottom edge 27 thereof engages the pipette tip member upper edge.

Figure 5:
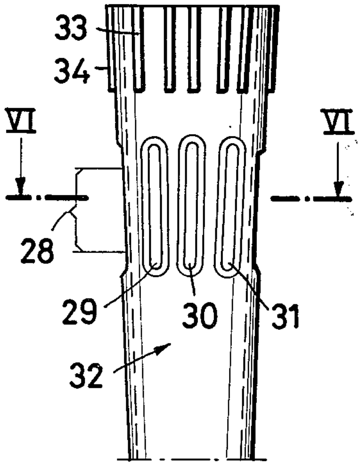
Figure 6:
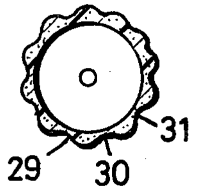
Figure 9:
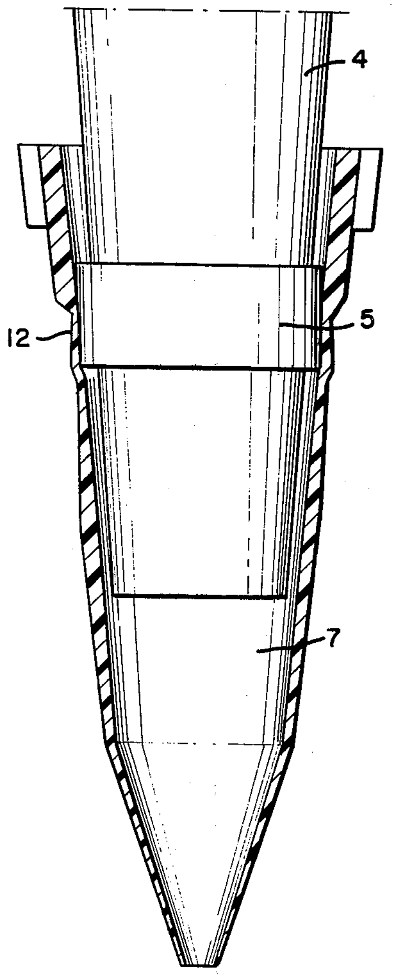
FIG. 9 is a cross-section view showing the tip member of FIG. 2 assembled with the pipette device shown in FIG. 1.
Figure 10:
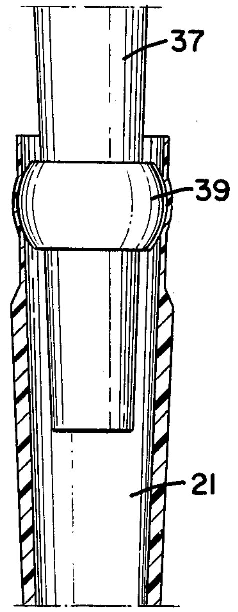
FIG. 10 is a cross sectional view showing the tip member of FIG. 3 assembled with the pipette device shown in FIG. 8.

In the embodiment shown in FIGS. 5 and 6 — FIG. 6 being a sectional view along the line VI—VI of FIG. 5 — the reduction of wall rigidity within the sealing zone 28 is provided by a plurality of axial grooves 29–31 that are equally spaced about the circumference of the tip member. As may be seen, several downwardly extending ribs 33, 34 that are similar to the ribs 15 shown in FIG. 2 are arranged at the upper edge of the pipette tip member 32. As may be seen by the sectional view of FIG. 6, the grooves 29–31 are of a relatively shallow depth with inclined side walls.

Figure 7:
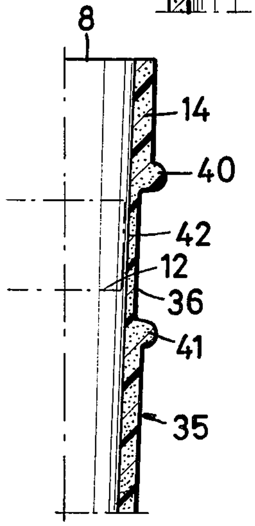

The embodiment of a pipette tip member 35 shown in FIG. 7 includes an upper wall portion 14 of normal wall thickness and a reduced thickness wall portion 36 spaced from the upper opening 8. The wall portion 36 is of an equal thickness along its length. At the upper and lower ends of this wall portion 36 are provided continuous annular beads 40, 41 respectively. These beads 40, 41 allow an extreme reduction of wall rigidity in between the beads, i.e., to provide an extremely thin wall portion 42 therebetween.

Figure 8:
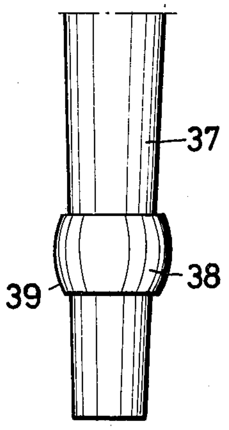
FIG. 8 is an elevational view of the adapter cone portion of a pipette in an enlarged scale when compared to FIG. 1.

FIG. 8 illustrates part of a pipette different from the one shown in FIG. 1 and particularly the adapter cone 37 thereof. Although in this embodiment the sealing zone likewise includes a projecting collar 38 corresponding to the collar 5 of the embodiment shown in FIG. 1, this collar 38 includes a spherically convex surface 39 with which may be engaged by the yieldable and optionally resilient reduced rigidity wall portions of the pipette tip member. A seating surface of this type is particularly favorable when used in combination with resilient wall portion pipette tip members.

The embodiments of the invention in which an exclusive property or privilege is claimed are defined as follows:

1. An improved slip-on pipette tip member in the form of an elongated receptacle being at least partly of a conical configuration for mating with an adapter cone of a pipette device onto which the tip member is to be engaged, said tip member having a top mounting opening, a bottom fluid intake and discharge opening, and a hollow passageway formed by outer walls and extending between said top mounting opening and said fluid intake and discharge opening for fluid communication therebetween wherein the improvement comprises a sealing zone located along the axial length of said pipette tip member in a position between said mounting opening and said intake and discharge opening to be engaged by a radially projecting collar on the end portion of said adapter cone of said pipette device, said sealing zone comprising a portion of wall area of selectively reduced wall thickness at the outer surface of said tip member, said wall portion of said tip member being more resilient and elastically adaptable in the area of said sealing zone relative to the other walls of said tip member so that said sealing zone is deformable with yieldable characteristics being of reduced rigidity in order to more effectively receive and seal said end of said adapter cone.

2. The improved slip-on pipette tip member as defined in claim 1, wherein the walls of said sealing zone are of a reduced thickness and rigidity over a continuous annular region.

3. The improved slip-on pipette tip member as defined in claim 1, wherein said reduced rigidity of the wall in said sealing zone is provided by a plurality of grooves extending in the axial direction of the tip member.

4. The improved slip-on pipette tip member as defined in claim 1, wherein the thickness of the reduced thickness wall portion of said sealing zone is substantially constant at least throughout the axial extension of the sealing zone.

5. The improved slip-on pipette tip member as defined in claim 1, wherein the thickness of the reduced thickness wall portion of said sealing zone varies at least along the axial extension of the sealing zone.

6. The improved slip-on pipette tip member as defined in claim 5, wherein the thickness of the reduced thickness wall portion of said sealing zone increases from the end thereof closer to said mounting opening toward the end thereof closer to said intake and discharge opening.

7. The improved slip-on pipette tip member as defined in claim 6, wherein the sealing zone is disposed in a conical wall portion spaced from the top mounting opening, and further comprising a restriction formed below a wall portion of substantially even thickness located between said mounting opening and said sealing zone, the wall thickness within the sealing zone gradually increasing below said restriction in a downward direction toward the open lower tip end having said intake and discharge opening, up to the overall normal wall thickness of the tip member.

8. The improved slip-on pipette tip member as defined in claim 1, wherein the sealing zone is spaced from the edge of the top mounting opening.

9. The improved slip-on pipette tip member as defined in claim 1, wherein the reduced thickness wall portion is arranged at the end having a greater width of the pipette tip member, and further comprising a continuous annular outer bead located at said wider end of the tip member.

10. The improved slip-on pipette tip member as defined in claim 1 further comprising a first bead arranged above the reduced thickness wall portion, and a second bead arranged below the reduced thickness wall portion.

11. The improved slip-on pipette tip member as defined in claim 1 further comprising a plurality of support surfaces spaced from the top mounting opening, said support surfaces being formed by axially extending ribs adjacent the top mounting opening.

* * * * *